March 13, 1962
S. A. YOUNG
3,025,085
SPOUT CONSTRUCTION
Filed May 28, 1957
2 Sheets-Sheet 1
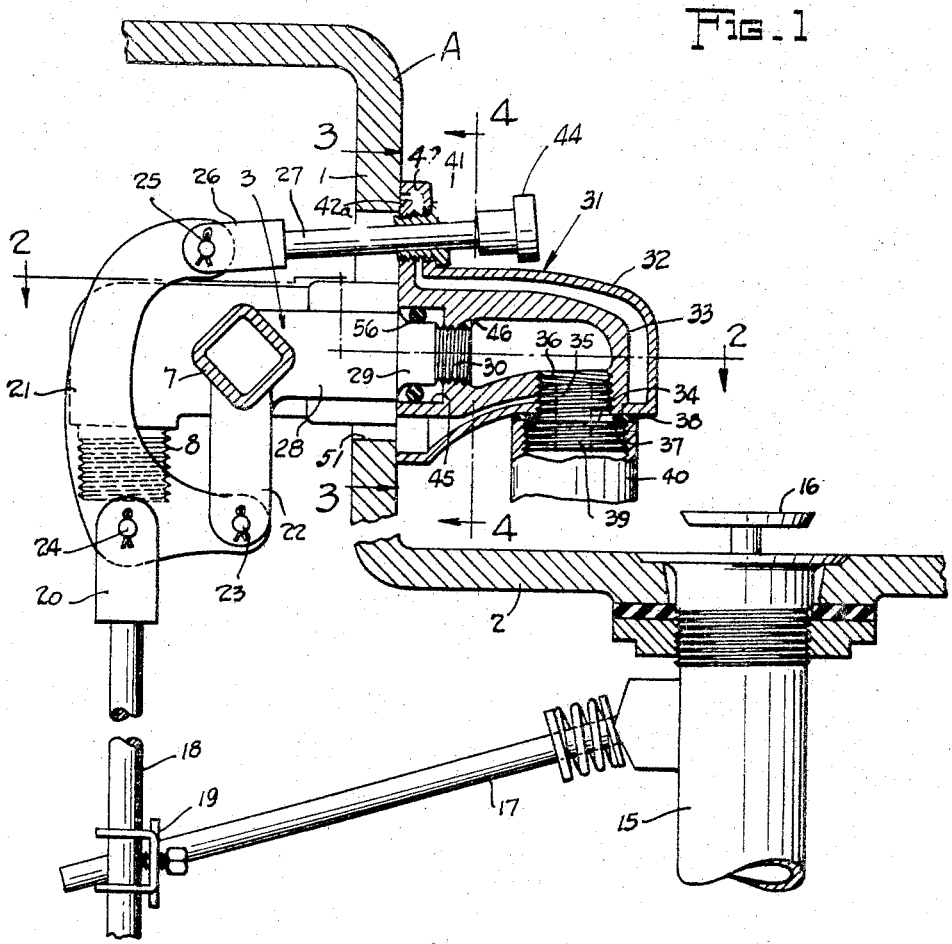
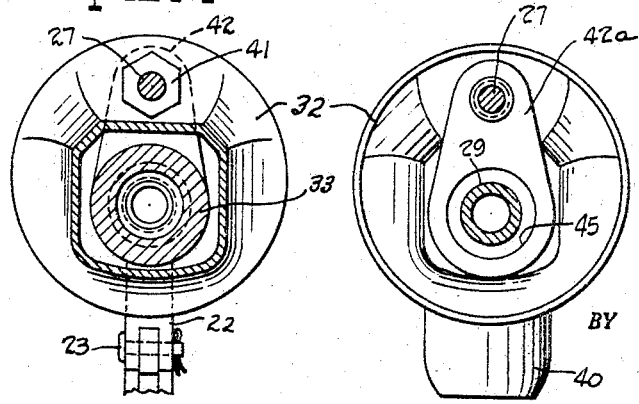
INVENTOR.
S. A. YOUNG
BY
Robb Robb
attorneys

United States Patent Office 3,025,085
Patented Mar. 13, 1962

3,025,085
SPOUT CONSTRUCTION
Stephen A. Young, 1005 E. Monroe St., Delphi, Ind.
Filed May 28, 1957, Ser. No. 662,193
1 Claim. (Cl. 285—193)

This invention relates to spout construction or the like, and more particularly to certain means which facilitate the mounting of a fixture for example on a lavatory, and makes possible leak proof connection of certain parts without reliance upon extreme tightness of joints, the position of the parts between which a leak might ordinarily occur usually being crucial.

As an example of the most presently desirable phase of this invention, the same has been found entirely suitable for incorporation into a fixture known as the ledge type lavatory fixture, in which fixture the body and most of the mechanism thereof is mounted behind the ledge of a lavatory ordinarily, parts extend through the ledge, including valves, stems, control elements and an outlet member, with suitable decorative parts being availed of to cover the extending parts and openings, the fastening of the outlet member and the manipulation of adjusting means being resorted to for permanently locating the fixture as a whole in the instant invention.

One of the primary problems heretofore has been to provide a sealing connection of the spout unit to the outlet member which extends through the back of the lavatory, having in mind that the thicknesses vary and the relative position of the body from which the outlet extends may likewise vary with respect to the amount of outlet extension. Thus when a spout unit, normally threadedly engaged with the outlet portion, is tightened, it may or may not be properly in position to deliver water therefrom. If attempt is made to adjust the angle of the outlet end, a leak usually develops unless all of the various dimensions happen to be suitable.

Since the last mentioned condition seldom prevails as will be clear to those skilled in the art, it has become necessary and in fact only possible by the invention hereof to provide the required adjustments, compensating for several varying factors, whereby no leakage is present and yet generally standard assembly procedures are used.

The foregoing having suggested the problems involved herein, the primary object of the invention is to provide a fixture or basically a spout, in which a spout unit may be connected to a body unit in a manner to prevent leakage and yet obviate the necessity of using heavy wrench pressures.

A still further object of the invention is to provide an arrangement of the above described type which is suitable for use in a lavatory fixture of the ledge type, wherein an external spout unit may be connected to a body concealed by the lavatory, without requiring precise dimensioning of the various parts.

Yet another object of the invention is to provide a lavatory fixture wherein the body is provided with an outlet portion having a sealing ring seat thereon, a spout unit for connection to the body is formed with a sealing ring seat spaced from that of the portion, and a sealing ring is interposed between the seats, acting to prevent leakage irrespective of the relatively connected longitudinal positions of the respective parts.

Still another object of the invention is to provide a lavatory fixture or the like, wherein spaced sealing ring seats are arranged on separable parts, said seats being of substantial longitudinal extent to facilitate different longitudinal positioning of the parts with respect to each other, suitable sealing means being provided and effectively sealing the parts with respect to one another.

Other and further objects of the invention will be understood from the specification attached hereto and shown in the drawings, wherein:

FIGURE 1 is somewhat fragmentary, sectional view showing a typical arrangement involving the invention as incorporated into a lavatory fixture.

FIGURE 3 is a vertical sectional view taken about on the line 3—3 of FIGURE 1 looking in the direction of the arrows.

FIGURE 4 is a fragmentary sectional view taken about on the line 4—4 of FIGURE 1 looking in the direction of the arrows.

Figure 2:
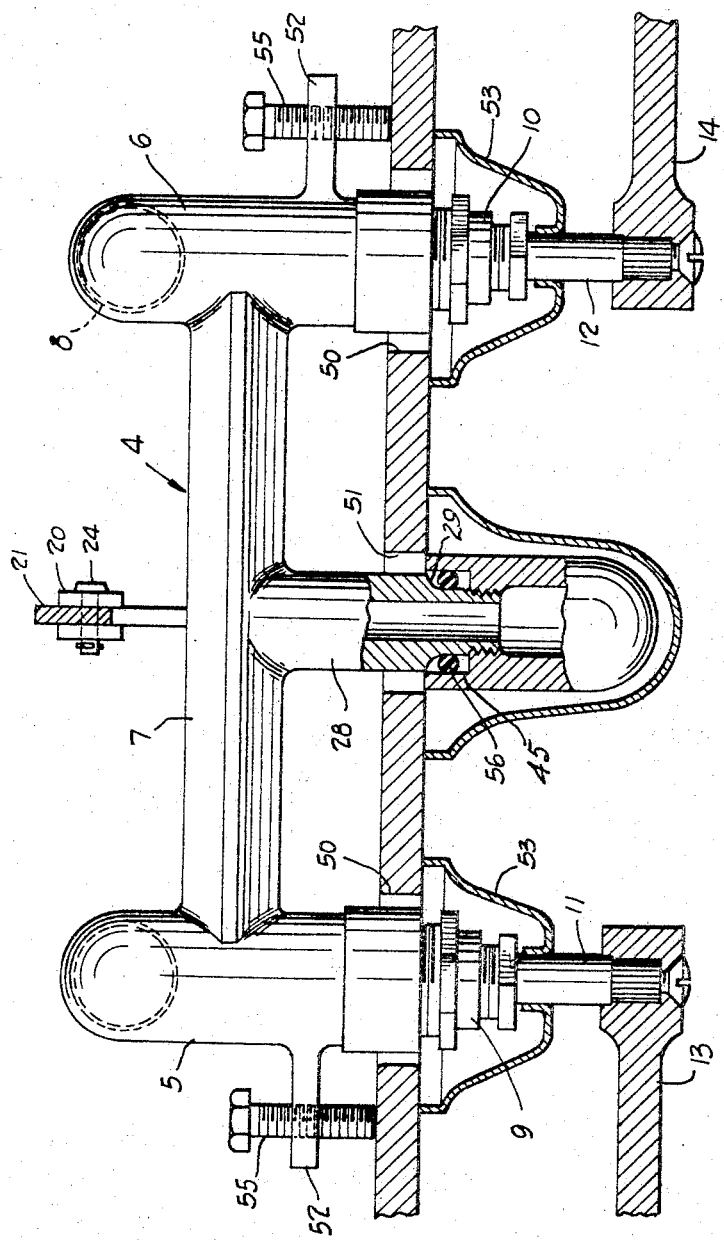
FIGURE 2 is a sectional view taken about on the line 2—2 of FIGURE 1 looking in the direction of the arrows.

The invention is shown in the several views, as being embodied in a lavatory fixture of the ledge type, which fixture is in turn mounted on a lavatory indicated at A in FIGURE 1, the lavatory including the ledge 1 the bottom 2 thereof with the lavatory fixture as a whole being designated 3.

Such a fixture may generally include and in this instance does include a body somewhat better shown in FIGURE 2 designated 4 which body includes an inlet section 5 with a corresponding inlet or supply section 6 at the opposite ends of a connecting mixing chamber section 7 the inlet or supply sections being provided with threaded portions as at 8 for the supply section 6 for example this arrangement being shown in FIGURE 1 and making possible the connection of hot and cold water supplied to the body in a conventional manner.

The inlet and supply sections 5 and 6 are also provided with control units such as generally indicated at 9 and 10 respectively, which control units are arranged with the usual stems such as 11 and 12 with corresponding handles 13 and 14 therefore. The handles 13 and 14, through the stems 11 and 12 obviously regulate valve mechanisms in the sections 5 and 6 in accordance with conventional practice and only referred to herein as will be readily understood.

As is often desirable, there is provided with the lavatory fixture of this invention a waste control unit known as a pop-up unit and designated at 15 in FIGURE 1, which control unit includes a plug 16 operable by a ball rod 17, the unit 15 being mounted in the bottom 2 of the lavatory as will be readily apparent.

In order to control the opening and closing of the valve or plug 16, a lift rod 18 is connected to the ball rod 17 by means of a suitable link member 19 the lift rod in turn being connected at its upper end by means of a yoke 20 to an operating lever 21. The operating lever 21 is mounted pivotally at the lower end of a pair of extensions 22 which may preferably be formed integrally with the mixing chamber or body portion 7 and a suitable pivot such as 23 being provided for such mounting and connection of the yoke 20 with the lever 21 being effected by a further pivot 24.

At the upper end of the lever 21, the same may be connected as by a pivotal connection 25 to a further yoke 26 which is in turn at the inner end of a push rod 27, the push rod 27 extending through the back 1 of the lavatory indicated at A.

Now in order to provide for the outlet of the mixed water admitted into the mixing chamber portion 7, by means of the control units 9 and 10, a suitable outlet section or spout outlet denoted 28 is provided, being integral with the mixing chamber section 7 and having at its outer extremity a necked down portion providing a sealing ring seat 29, which sealing ring seat is provided at its outermost extremity with a threaded portion 30 for purposes to be subsequently explained.

As will be readily observed from a consideration of the drawings, a suitable spout unit generally designated 31 is provided, and is of a composite nature having an outer shell 32 which is generally finished in attractive chrome or the like, and adapted to confine and enclose a body 33 therewithin, which body 33 is arranged to be maintained in position within the housing or shroud 32 by means of an adaptor 34 which adaptor is provided with threads 35 for engaging comating threads 36 formed in the outlet end of the spout body 33 and a shoulder 37 above which as indicated at 38 in FIGURE 1 is mounted a suitable gasket. The portion of the adaptor 34 below the shoulder 37 is in turn threaded as at 39 so as to receive an aerator generally indicated at 40 in FIGURES 1 and 3.

In order to further assist in maintaining the body 33 of the composite spout unit in place within the shroud or housing 32, a threaded ferrule 41 is shown in FIGURE 1 as being entered into a suitable opening in an upper extension or tongue 42a of the body 33, which ferrule 41 is hollow and includes a shoulder 42 thereon to enable the part to be threadedly engaged with the portion 42 and likewise engage the corresponding opening in the housing or shroud 32. Obviously when the ferrule 41 is suitably manipulated by any kind of an appropriate tool, the housing or shroud 32 will be positioned with respect to the body 33 by the ferrule 41 and the adaptor 34 previously mentioned.

The ferrule 41 also provides for the guiding motion of the push rod 27 at the outer end of which is a knob 44 to effect manipulation of the linkages disclosed and operate the pop-up unit 15 mentioned earlier.

Now the body 33 of the composite spout unit 31 is equipped with a sealing ring seat indicated at 45, which sealing ring seat is as will be understood from a consideration of FIGURES 1 and 2 suitably spaced from the sealing ring seat 29 and substantially co-extensive therewith. At the inner end of the seat portion so to speak a threaded section 46 is provided to enable the spout as a whole to be threadedly engaged with the corresponding thread 30 of the spout outlet 28 to normally position the spout and afford passage of the water mixture from the spout outlet 28 through the spout and into the lavatory.

Heretofore considerable difficulty has been encountered in mounting the fixture in the rear of the ledge 1 so as to enable connection of the various parts and particularly the mounting of the spout on the spout outlet so as to obviate leakage between the two parts which is annoying in any event and can be of course the cause of considerable damage if the leak is permitted. Obviously the back 1 is provided with suitable drilling such as 50 for the introduction of the control unit portions 9 and 10 and a similar opening at 51 for the spout outlet 28, prior to assembly of the spout unit 31 on the spout outlet as will be apparent.

In this particular invention suitable ears 52 are provided in order to assist in mounting the unit as a whole in conjunction with the spout unit in a manner to be subsequently described, it being noted of course that suitable escutcheons such as 53 are provided to surround and enclose the unfinished portions of the control units 9 and 10 in accordance with generally conventional practice.

The considerable advantages afforded by the construction of the faucet in accordance with this invention are most readily appreciated when the ease and rapidity with which the same is mounted are explained and of course the adaptability of the fixture to various conditions will be readily understood thereby.

Assuming therefore that it is desired to mount the fixture of the invention and for this purpose, FIGURE 2 will be referred to primarily, initially the fixture is of course provided with the handles 13 and 14 removed, the escutcheon 53 removed and the spout unit 31 being disconnected.

Thereafter the unit as a whole may be inserted from the rear of the lavatory through the openings 50 and 51 so that set screws designated 55 in the ears 52 having been previously generally adjusted about as shown, such set screws are caused to contact the rear surface of the ledge back 1 and thereafter a suitable sealing ring which may be of generally round cross-section denoted at 56 may be mounted or located on the sealing ring seat 29. Thereafter the spout unit 31 which includes as will be recalled a body 33 enclosed by the shell 32 the shell being positioned by the ferrule 41 as well as the adaptor 34, is caused to threadedly engage with the threads 30 at the extremity of the sealing ring seat 29 and the spout unit as a whole rotated until one or two threads may be positively engaged with one another and the spout unit arranged so that the outlet through the aerator 40 is in proper downwardly directed position. Obviously at this time the body 4 may not be rigidly positioned behind the ledge back 1 and resort may be had to manipulation of the set screws 55 so as to draw the spout unit 31 closely against the outer space of the wall 1. Thus the unit as a whole may be rigidly mounted as will be apparent and there is no necessity to manipulate the spout unit at all since there will be no leakage under any conditions by reason of the fact that the sealing ring 56 is located in contact with both sealing ring seats 29 and 45. There is no necessity that the threaded engagement of the spout unit 31 with the outlet 28 be a tight threaded engagement which might or might not provide the wrong angle on the outlet end, the arrangement here described being such that adjustment within wide limits is possible to accommodate for variations in wall thicknesses and in manufacturing tolerances of one kind or another.

As will be readily understood the entire unit may be completely assembled thereafter by placing the escutcheons 53 in place and thereafter connecting the handles 13 and 14 by the conventional means shown.

Of course the lift rod and ball rod connection of the pop-up unit 15 as well as the push rod 27 and the knob 44 may be connected up as will be readily understood in a consideration of the drawings.

In view of the foregoing there has thus been disclosed a novel spout connection which enables the positioning of a body with which the spout is connected whether the body be of the particular form herein disclosed so that the angle of the outlet end of the spout is always in the proper direction irrespective of wall thickness and there will be no leakage possible between the parts corresponding to the spout outlet 28 and the spout unit 31 during use of the device.

I claim:

In spout construction of the class described, in combination, a body through which liquid flows to an outlet end thereof, a supporting wall, said body being mounted in rear of and in engagement with said rear of the supporting wall, the outlet end extending through and outwardly from such wall, a sealing ring seat on said end, a threaded portion at said end, a spout unit mounted on said end in abutting relation with the front of said wall, said unit being threadedly engaged with the threaded end portion aforesaid and positionable thereon in a plurality of positions, said unit further having a sealing ring seat spaced from the outlet end seat, and a sealing ring engaging both of said seats in all of the said positions of the spout unit with respect to the outlet end to thereby seal the same, said ring being shiftable along said seats corresponding to said positions, and means to position the body with respect to the wall, the aforesaid means including the said spout unit mentioned.

References Cited in the file of this patent

UNITED STATES PATENTS

| | | |
|---|---|---|
| 852,220 | Cecil | Apr. 30, 1907 |
| 1,137,556 | Von Glahn | Apr. 27, 1915 |
| 1,790,316 | Mueller | Jan. 27, 1931 |
| 1,933,839 | Bloch | Nov. 7, 1933 |
| 2,002,086 | Dylewski | May 21, 1935 |
| 2,214,619 | Krieger | Sept. 10, 1940 |
| 2,524,951 | Ashton | Oct. 10, 1950 |

FOREIGN PATENTS

| | | |
|---|---|---|
| 658 | Great Britain | Nov. 21, 1891 |
| 9,765 | Great Britain | of 1893 |